United States Patent
Kase et al.

(10) Patent No.: US 8,927,039 B2
(45) Date of Patent: Jan. 6, 2015

(54) METHOD FOR MANUFACTURING REFINED FAT OR OIL

(75) Inventors: Minoru Kase, Kamisu (JP); Tetsuya Abe, Kamisu (JP); Shinpei Fukuhara, Kamisu (JP); Toshiteru Komatsu, Kamisu (JP); Keiji Shibata, Kamisu (JP)

(73) Assignee: KAO Corporation, Tokyo (JP)

( * ) Notice: Subject to any disclaimer, the term of this patent is extended or adjusted under 35 U.S.C. 154(b) by 0 days.

(21) Appl. No.: 13/516,415

(22) PCT Filed: Dec. 14, 2010

(86) PCT No.: PCT/JP2010/072477
§ 371 (c)(1),
(2), (4) Date: Jun. 15, 2012

(87) PCT Pub. No.: WO2011/074574
PCT Pub. Date: Jun. 23, 2011

(65) Prior Publication Data
US 2012/0258232 A1    Oct. 11, 2012

(30) Foreign Application Priority Data

Dec. 15, 2009  (JP) ................... 2009-283660
Mar. 31, 2010  (JP) ................... 2010-083199

(51) Int. Cl.
| | |
|---|---|
| *C11B 3/10* | (2006.01) |
| *C11B 3/14* | (2006.01) |
| *A23D 9/02* | (2006.01) |
| *A23D 7/02* | (2006.01) |

(52) U.S. Cl.
CPC ... *A23D 7/02* (2013.01); *C11B 3/10* (2013.01); *C11B 3/14* (2013.01)
USPC .......................... 426/417; 426/601

(58) Field of Classification Search
None
See application file for complete search history.

(56) References Cited

U.S. PATENT DOCUMENTS

| | | | | |
|---|---|---|---|---|
| 4,599,143 | A | | 7/1986 | Stage |
| 4,601,790 | A | | 7/1986 | Stage |
| 4,656,045 | A | * | 4/1987 | Bodor et al. ............... 426/601 |
| 4,781,864 | A | * | 11/1988 | Pryor et al. ................ 554/188 |
| 5,023,100 | A | * | 6/1991 | Chang et al. .............. 426/601 |
| 5,912,042 | A | * | 6/1999 | Cain et al. ................. 426/607 |
| 6,623,774 | B2 | * | 9/2003 | Kendrick et al. ......... 426/330.6 |
| 7,598,407 | B2 | * | 10/2009 | Kruidenberg ................ 554/22 |
| 8,084,071 | B2 | * | 12/2011 | Miyake et al. ............. 426/417 |
| 8,227,010 | B2 | * | 7/2012 | Kase et al. ................. 426/601 |
| 8,461,363 | B2 | * | 6/2013 | Keller et al. ................ 554/205 |
| 2009/0300972 | A1 | * | 12/2009 | Jalalpoor et al. ............ 44/308 |
| 2010/0255157 | A1 | * | 10/2010 | Arhancet et al. ........... 426/106 |
| 2010/0298587 | A1 | * | 11/2010 | Schurz ...................... 554/191 |
| 2011/0206804 | A1 | | 8/2011 | Kase et al. |
| 2012/0177791 | A1 | | 7/2012 | Kase et al. |

FOREIGN PATENT DOCUMENTS

| | | |
|---|---|---|
| JP | 56-21554 | 2/1981 |
| JP | 3 7240 | 2/1991 |
| JP | 3-244344 | 10/1991 |
| JP | 4-154897 | 5/1992 |
| JP | 4 261497 | 9/1992 |
| JP | 2000-282080 | 10/2000 |
| JP | 2007 14263 | 1/2007 |
| JP | 2009 40854 | 2/2009 |
| JP | 2009-79153 | 4/2009 |
| WO | WO 2009/019893 A1 | 2/2009 |

OTHER PUBLICATIONS

Shahidi, F. 2005. Bailey's Industrial Oil and Fat Products, 6th edition, vol. 5. John Wiley & Sons, Hoboken, New Jersey. p. 285-289, 293, 295, 341-345, 366-371.*

Hui, Y. H. 1996. Bailey's Industrial Oil and Fat Products, 5th edition, vol. 4. John Wiley & Sons, New York. p. 27-30, 45-51.*

Swern, D. 1982. Bailey's Industrial Oil and Fat Products, 4th edition, vol. 2. John Wiley & Sons, New York. p. 253-255, 275-276, 288, 292-300.*

Swern, D. 1982, Bailey's Industrial Oil and Fat Products, 4th edition, vol. 1, p. 205-212.*

Bauer, N., et al., "Glycidol-Fettsaeureester in Saeuglingsmilchnahrung nachgewiesen," DLR, vol. 105, No. 6, pp. 361-362, (Jun. 2009).

Zelinkova, Z., et al., "Fatty acid esters of 3-chloropropane-1,2-diol in edible oils," Food Additives and Contaminants, vol. 23, No. 12, pp. 1290-1298, (2006).

International Search Report Issued Mar. 8, 2011 in PCT/JP10/72477 Filed Dec. 14, 2010.

Japanese Office Action Issued Nov. 27, 2012 in Patent Application No. 2010-083199 (with English translation).

K. Franke et al., "Influence of chemical refining process and oil type on bound 3-chloro-1, 2-propanediol contents in palm oil and rapeseed oil", LWT—Food Science and Technology, vol. 42, 2009, pp. 1751-1754.

"Edible Oil & Fat Products", Bailey's Industrial Oil & Fat Products, Sixth Edition, vol. 2, 2005, pp. 82-90 and cover page.

(Continued)

*Primary Examiner* — Carolyn Paden
(74) *Attorney, Agent, or Firm* — Oblon, Spivak, McClelland, Maier & Neustadt, L.L.P.

(57) ABSTRACT

Provided is a method for manufacturing refined fats and oils. Here fats and oils are brought into contact with an adsorbent and subsequently treated with water vapor under at least one condition of the following conditions. In condition I, the time for which the fats and oils are brought into contact with the water vapor in a temperature range of 175° C. to 205° C. for from 5 to 110 minutes. In condition 2, the fats and oils are brought into contact with the water vapor in a temperature range of 205° C. to 215° C. for from 5 to 50 minutes. In condition 3, the fats and oils are brought into contact with the water vapor in a temperature range of 215° C. to 230° C. for from 5 to 30 minutes.

8 Claims, No Drawings

(56) References Cited

OTHER PUBLICATIONS

K. Franke et al., "Influence of chemical refining process and oil type on bound 3-chloro-1, 2-propanediol contents in palm oil and rapeseed oil", LWT—Food Science and Technology, http://www.sciencedirect.com/science/article.pii/S0023643809001558, vol. 42, No. 10, Dec. 2009, 1 page, abstract only.

"Bleaching Earth", http://ejje.weblio.jp/content/bleaching+earth, Nov. 14, 2012, 2 pages.

Office Action issued Mar. 6, 2013 in Chinese Application No. 201080056843.3.

U.S. Appl. No. 13/634,895, filed Sep. 14, 2012, Abe, et al.

U.S. Appl. No. 13/635,542, filed Sep. 17, 2012, Fukuhara, et al.

Chuanguo MA, Processing Technology and Equipment for Oil and Fat, Chemical Industry Press, pp. 73-74, Jan. 31, 2004 (with English translation).

John Christian Larsen, "3-MCPD Esters in Food Products", ILSI Europe Report Series, Oct. 2009, pp. 1-32.

Petrochemistry lexicon, Japan oil Chemists, Society, Mar. 25, 2004, "flaxseed", pp. 16-17, (with English translation).

Takaharu Miyakawa, Shokuyoabura Seizo no Jissai (Actuals of the manufacture of the edible oil), Saiwai Shobo, Jul. 5, 1988, pp. 120-123 (with English translation).

* cited by examiner

METHOD FOR MANUFACTURING REFINED FAT OR OIL

FIELD OF THE INVENTION

The present invention relates to a method for manufacturing refined fats and oils with less by-products, good taste and flavor and good hue.

BACKGROUND OF THE INVENTION

Fats and oils are essential for a human body as nutrients and source of energy supply (the primary function), and moreover, are important for providing so-called sensory function (the secondary function), which satisfies palatability of foods, for example, taste or aroma. In addition, fats and oils containing diacylglycerols at a high concentration are known to show physiological effects (the third function) such as body fat-burning effect.

Untreated fats and oils obtained by compressing plant seeds, germs, fruit pulps, and the like contain fatty acids, monoacylglycerols, odor components, and the like. Further, in processing the fats and oils, minor components are produced as by-products through heating steps such as transesterification reaction, esterification reaction, and hydrogenation treatment, thereby impairing taste and flavor. In order to use the fats and oils as edible oils, it is necessary to improve the taste and flavor by removing these by-products. Thus, treatment of so-called deodorization, in which the fats and oils are brought into contact with water vapor under reduced pressure at high temperature, is generally performed (Patent Document 1).

In addition, in order to improve the taste and flavor in diacylglycerols-rich fats and oils, there have been reported a method involving adding an organic acid to diacylglycerols-rich fats and oils and subsequently subjecting the fats and oils to decolorization treatment using a porous adsorbent and deodorization treatment (Patent Document 2) and a method involving hydrolyzing raw material fats and oils by an enzymatic degradation method to produce fatty acids and glycerin, subjecting the fatty acids and glycerin to esterification reaction, and subsequently subjecting the resultant products to deodorization treatment so that deodorization time and deodorization temperature fall within specific ranges (Patent Document 3).

PRIOR ART DOCUMENT

Patent Document

[Patent Document 1] JP-B-H03-7240
[Patent Document 2] JP-A-H04-261497
[Patent Document 3] JP-A-2009-40854

SUMMARY OF THE INVENTION

The present invention relates to a method for manufacturing refined fats and oils, including: treating fats and oils by bringing the fats and oils into contact with an adsorbent; and subsequently treating the fats and oils by bringing the fats and oils into contact with water vapor under at least one condition selected from the following conditions:

(condition 1) the time for which the fats and oils are brought into contact with the water vapor in a temperature range of 175° C. or more and 205° C. or less is from 5 to 110 minutes;

(condition 2) the time for which the fats and oils are brought into contact with the water vapor in a temperature range of more than 205° C. and 215° C. or less is from 5 to 50 minutes; and (condition 3) the time for which the fats and oils are brought into contact with the water vapor in a temperature range of more than 215° C. and 230° C. or less is from 5 to 30 minutes.

The present invention also relates to a refined fat and oil, including glycidol fatty acid esters in an amount of 7 ppm or less, measured by a Deutsche Gesellschaft für Fettwissenschaft (DGF) standard method C-III 18(09), and diacylglycerols in an amount of 20 mass % or more.

EMBODIMENT FOR CARRYING OUT THE INVENTION

In recent years, consumer demand for improvement of quality of edible fats and oils has been largely growing, and consumers who are sensitive to taste and flavor has been remarkably increased. Thus, fats and oils having higher purity and better taste and flavor and better hue than conventional ones are desired.

However, the conventional process of deodorization performed for improving the taste and flavor has been found to further increase the amount of by-products in some cases. That is, in the case where the deodorization treatment is carried out at low temperature, the resultant fats and oils have poor taste and flavor and poor hue owing to a small effect of distilling odor components, therefore, it is necessary to perform the deodorization treatment at high temperature. However, it has been found that glycidol fatty acid esters are produced as different by-products at high temperature. On the other hand, when the deodorization treatment is carried out at low temperature, although production of by-products is suppressed to some extent, the taste and flavor and hue are improved insufficiently. In particular, for diacylglycerols-rich fats and oils, such tendency is observed significantly.

Therefore, the present invention relates to providing a method for manufacturing fats and oils with less by-products, good taste and flavor and good hue.

The inventors of the present invention have made various efforts for studying refining operation of fats and oils, and have found that production of by-products is suppressed by treating fats and oils by bringing the fats and oils into contact with an adsorbent in advance and subsequently treating the fats and oils by bringing the fats and oils into contact with water vapor at a specific temperature and for a specific period of time, and that fats and oils obtained through such treatments have good taste and flavor and good hue.

According to the present invention, refined fats and oils with less by-products, good taste and flavor and good hue are provided.

Fats and oils used for the manufacturing method of the present invention refer to fats and oils containing triacylglycerols and/or diacylglycerols. Any kinds of vegetable fats and oils and animal fats and oils may be used as the fats and oils.

Specific examples of raw materials include rapeseed oil, sunflower oil, corn oil, soybean oil, rice oil, safflower oil, cotton seed oil, beef tallow, linseed oil, and fish oil.

By-products are easily produced by using diacylglycerols in refining step as compared with using triacylglycerols. Thus, it is more preferred to use fats and oils containing diacylglycerols in manufacturing method of the present invention. The content of diacylglycerols is preferably 20 mass % (hereinafter, simply described as "%") or more, more preferably 50% or more, and even more preferably 70% or more. The upper limit of the content is not particularly defined, and is preferably 99% or less, more preferably 98% or less, and even more preferably 97% or less.

The fats and oils containing diacylglycerols can be obtained through esterification reaction between fatty acids, derived from fats and oils, and glycerin, glycerolysis reaction between fats and oils and glycerin, or the like. These reactions are broadly classified into chemical methods using a chemical catalyst such as an alkali metal or an alloy thereof, or an oxide, hydroxide, or alkoxide having 1 to 3 carbon atoms of an alkali metal or an alkali earth metal, and enzymatic methods using an enzyme such as a lipase. Among them, the reactions are preferably carried out under enzymatically mild conditions by using a lipase or the like as the catalyst in view of obtaining excellent taste and flavor or the like.

In the manufacturing method of the present invention, first, fats and oils are treated by bringing the fats and oils into contact with an adsorbent. The adsorbent is preferably a porous adsorbent, and examples thereof include activated carbon, silicon dioxide, and a solid acid adsorbent. Examples of the solid acid adsorbent include acid clay, activated clay, activated alumina, silica gel, silica-alumina, and aluminum silicate. The adsorbents may be used singly or in combination of two or more kinds thereof. Of those, a solid acid adsorbent is preferred, and acid clay and activated clay are more preferred from the standpoints of reducing the content of by-products and improving the taste and flavor and hue.

Both the acid clay and activated clay contain $SiO_2$, $Al_2O_3$, $Fe_2O_3$, CaO, MgO, and the like as general chemical components, and have a $SiO_2/Al_2O_3$ ratio of preferably 3 to 12, and more preferably 4 to 10. Further, the acid clay and activated clay each preferably have a composition including from 1 to 5% of $Fe_2O_3$, from 0 to 1.5% of CaO, and from 1 to 7% of MgO.

The activated clay is a product obtained by treating naturally occurring acid clay (montmorillonite clay) with a mineral acid such as sulfuric acid, and is a compound having a porous structure with a large specific surface area and adsorption capability.

It is known that, when the acid clay is further treated with an acid, the specific surface area is changed, thereby improving its decoloring capacity and changing its physical properties. The specific surface area of the acid clay or activated clay varies depending on the degree of the acid treatment and the like, and is preferably from 50 to 400 $m^2/g$. The acid clay or activated clay has a pH (5% suspension) of preferably from 2.5 to 9, and more preferably from 3 to 7.

Examples of the acid clay which may be used include commercially available products such as MIZUKA ACE #20 and MIZUKA ACE #400 (both of which are manufactured by MIZUSAWA INDUSTRIAL CHEMICALS, LTD.), and examples of the activated clay which may be used include commercially available products such as GALLEON EARTH V2R, GALLEON EARTH NV, and GALLEON EARTH GSF (all of which are manufactured by MIZUSAWA INDUSTRIAL CHEMICALS, LTD.).

The amount of the adsorbent used is preferably less than 2.0%, more preferably from 0.1% to less than 2.0%, even more preferably from 0.2 to 1.5%, even more preferably from 0.3 to 1.3%, and even more preferably from 0.5 to 1%, relative to the amount of fats and oils from the standpoints of increasing a filtration rate and improving the productivity and the standpoint of increasing the yield.

The contact temperature between the fats and oils and the adsorbent is preferably from 20 to 150° C., more preferably from 40 to 135° C., even more preferably from 60 to 120° C., even more preferably from 60 to 105° C., and even more preferably from 90 to 105° C., from the standpoints of reducing the content of by-products and improving industrial productivity. In addition, the time for contact is preferably from 3 to 180 minutes, more preferably from 5 to 120 minutes, even more preferably from 7 to 90 minutes, and even more preferably from 15 to 90 minutes, from the same standpoints. The pressure may be reduced pressure or ordinary pressure, and is preferably reduced pressure from the viewpoints of suppressing oxidation and improving decoloring property.

In the present invention, subsequently the fats and oils are brought into contact with water vapor under specific conditions.

In the manufacturing method of the present invention, basically, the treatment of bringing the fats and oils into contact with water vapor is performed by steam distillation under reduced pressure, and the treatment may be performed by a batchwise method, a semi-continuous method, a continuous method, or the like. When the amount of the fats and oils to be treated is small, the batchwise method is preferably used, and when the amount is large, the semi-continuous method or the continuous method is preferably used. Example of apparatus for the semi-continuous method includes a Girdler type deodorization apparatus composed of a deodorization tower equipped with several trays. The treatment is performed in this apparatus by supplying fats and oils for deodorization from the upper part of the apparatus, and supplying the fats and oils to the next lower tray so that the fats and oils are successively moved down intermittently. Example of apparatus for the continuous method includes a thin-film deodorization apparatus filled with structures which achieve both vapor-liquid contact efficiency and low pressure loss in the deodorization tower and having improved contact efficiency with water vapor.

The treatment of bringing the fats and oils into contact with water vapor may be performed using one of the thin-film deodorization apparatus or the tray-type deodorization apparatus or using the thin-film deodorization apparatus and the tray-type deodorization apparatus in combination. In the present invention, the thin-film column or the tray-type deodorization apparatus is used preferably singly from the standpoints of reducing apparatus cost, improving the taste and flavor, and the like.

The amount of water vapor used is preferably from 0.3 to 20%, more preferably from 0.5 to 10%, and even more preferably from 1.7 to 4.5%, relative to the amount of fats and oils from the standpoint of improving the taste and flavor such as "delicious taste" or "rich taste" specific to the fats and oils. In addition, the pressure is preferably from 0.01 to 4.0 kPa, and more preferably from 0.06 to 1.0 kPa from the same standpoint.

The fats and oils are brought into contact with water vapor under at least one condition selected from the following conditions:

(condition 1) the time for which the fats and oils are brought into contact with the water vapor in a temperature range of 175° C. or more and 205° C. or less is from 5 to 110 minutes;

(condition 2) the time for which the fats and oils are brought into contact with the water vapor in a temperature range of more than 205° C. and 215° C. or less is from 5 to 50 minutes; and (condition 3) the time for which the fats and oils are brought into contact with the water vapor in a temperature range of more than 215° C. and 230° C. or less is from 5 to 30 minutes.

Under such conditions, it is possible to suppress production of by-products and to improve taste and flavor and hue. Note that the time for which the fats and oils are brought into contact with water vapor in each condition means the total time when the temperature falls within the specified range, and the temperature may vary as long as the temperature falls within the range. Therefore, the time for increasing and decreasing the temperature is included in the time for contact as long as the temperature falls within the range. Further, in the case where the temperature intermittently falls within the range because of a variation in the temperature, the total of the time during which the temperature falls within the range is defined as the time.

In the case where the contact temperature is 175° C. or more and 205° C. or less (condition 1), the time for contact is preferably from 10 to 90 minutes, more preferably from 15 to 70 minutes, and even more preferably from 34 to 60 minutes, from the standpoints of suppressing production of by-products and improving taste and flavor and hue.

Further, in the case where the contact temperature is more than 205° C. and 215° C. or less (condition 2), the time for contact is preferably from 8 to 45 minutes, more preferably from 12 to 40 minutes, and even more preferably from 15 to 34 minutes, from the same standpoints.

In the case where the contact temperature is more than 215° C. and 230° C. or less (condition 3), the time for contact is preferably from 7 to 27 minutes, more preferably from 10 to 24 minutes, and even more preferably from 15 to 24 minutes, from the same standpoints.

Two or more of the conditions 1 to 3 may be employed, but one of the conditions is preferably employed from the standpoints of suppressing production of by-products and improving taste and flavor and hue. The condition 1 or 2 is preferred, and the condition 1 is more preferred from the same standpoints.

In the manufacturing method of the present invention, refining step that is generally used for fats and oils may be carried out before the treatment of bringing the fats and oils into contact with the adsorbent or before or after the treatment of bringing the fats and oils into contact with water vapor. Specific examples thereof include top cut distillation step, acid treatment step, and water washing step.

The top cut distillation step refers to a step of distillation of fats and oils, thereby removing light weight by-products such as fatty acids from the fats and oils.

The acid treatment step refers to a step of adding chelating agents such as citric acid to fats and oils, followed by mixing them.

The water washing step refers to a step of bringing fats and oils into contact with water, thereby performing oil-water separation. Water washing can remove water-soluble by-products. The water washing step is preferably repeated more than once (for example, three times).

As a result of the treatments of the present invention, production of by-products, in particular, production of glycidol fatty acid esters in the refining step can be suppressed, thereby producing refined fats and oils with less by-products and good taste and flavor and hue.

The glycidol fatty acid esters can be measured by a method according to a Deutsche Gesellschaft für Fettwissenschaft standard method C-III 18(09) (DGF Standard Methods 2009 (14. Supplement), C-III 18(09), "Ester-bound 3-chloropropane-1,2-diol (3-MCPD esters) and glycidol (glycidyl esters)"). This measurement method is a method for measuring 3-chloropropane-1,2-diol esters (MCPD esters), and glycidol and esters thereof. In the present invention, to quantify glycidol ester, a method of "Option A" according to the standard method 7.1 ("7.1 Option A: Determination of the sum of ester-bound 3-MCPD and glycidol") is used. Details of the measurement method are described in Examples.

Although the glycidol fatty acid esters and the MCPD ester are different substances, in the present invention, a value determined by the measurement method is defined as a glycidol fatty acid ester content.

The content of the glycidol fatty acid esters in the refined fats and oils of the present invention is preferably 7 ppm or less, more preferably 6 ppm or less, even more preferably 5 ppm or less, and even more preferably 3 ppm or less.

The hue of the refined fats and oils of the present invention is represented by a 10R+Y value measured by a method described in Examples, and the value is preferably 20 or less, more preferably 18 or less, even more preferably 16 or less, even more preferably 15 or less, and even more preferably 14 or less.

Further, the content of diacylglycerols in the refined fats and oils of the present invention is 20% or more, preferably 30% or more, more preferably 50% or more, and even more preferably 70% or more. The upper limit of the content is not particularly defined, and is preferably 99% or less, more preferably 98% or less, and even more preferably 97% or less.

In order to improve storage stability and taste and flavor stability, an antioxidant may be added to the refined fats and oils of the present invention as is the case for general edible fats and oils. Examples of the antioxidant include natural antioxidants, tocopherol, ascorbyl palmitate, ascorbyl stearate, BHT, BHA, and phospholipids.

The refined fats and oils of the present invention can be used in exactly the same way as general edible fats and oils, and can be applied widely to various foods and drinks including fats and oils. For example, the refined fats and oils of the present invention may be used in: oil-in-water fat and oil processed foods such as drinks, desserts, ice creams, dressings, toppings, mayonnaises, and grilled meat sauces; water-in-oil fat and oil processed foods such as margarines and spreads; processed fat and oil foods such as peanut butters, frying shortenings, and baking shortenings; processed foods such as potato chips, snacks, cakes, cookies, pies, breads, and chocolates; bakery mixes; processed meat products; frozen entrees; and frozen foods.

Examples

[Method for Analysis]
(i) Hue

The hue means a value obtained by measuring in accordance with "Color (2.2.1-1996)" in "Standard methods for the Analysis of Fats, Oils and Related Materials, Edition 2003" edited by Japan Oil Chemists' Society using a Lovibond colorimeter with a 5.25-inch cell, and calculating based on the following equation (1).

$$\text{Hue} = 10R + Y \tag{1}$$

(In the equation, R=Red value, and Y=Yellow value.)
(ii) Measurement of glycidol fatty acid ester (in accordance with Option A of Deutsche Gesellschaft für Fettwissenschaft (DGF) standard method C-III 18(09))

Approx. 100 mg of fat and oil sample were weighed in a test tube with a lid, and 50 µL of an internal standard (3-MCPD-d5/t-butyl methyl ether), 500 µL of a mixed solution of t-butyl methyl ether/ethyl acetate (volume ratio 8:2), and 1 mL of 0.5 N sodium methoxide were added thereto. The mixture was stirred and subsequently allowed to stand still for 10 minutes. 3 mL of hexane and 3 mL of an aqueous solution of 3.3% acetic acid/20% sodium chloride were added thereto, and the mixture was stirred, followed by removal of the upper layer. 3 mL of hexane were further added thereto, and the mixture was stirred, followed by removal of the upper layer. 250 μL of a mixed solution of 1 g of phenylboronic acid/4 mL of 95% acetone were added thereto, and the mixture was stirred, subsequently hermetically sealed, and heated at 80° C. for 20 minutes. 3 mL of hexane were added thereto, and the mixture was stirred. After that, the upper layer was subjected to a gas chromatograph-mass spectrometer (GC-MS) for determination of the quantity of glycidol fatty acid esters. Note that a content of the glycidol fatty acid esters of 0.144 ppm or less was defined as ND (not detectable).

(iii) Composition of Glycerides

Approx. 10 mg of fat and oil sample and 0.5 mL of trimethylsilylating agent ("Silylating Agent TH" manufactured by Kanto Chemical Co., Inc.) were loaded into a glass sample bottle, hermetically sealed, and heated at 70° C. for 15 minutes. 1.0 mL of water and 1.5 mL of hexane were added thereto, followed by shaking. After standing still, the upper layer was subjected to gas chromatography (GLC) for analysis.

[Taste and Flavor]

The evaluation of taste and flavor of each sample was performed by panelists consisting of five members. Each member ate 1 to 2 g of the sample raw, and performed a sensory evaluation based on the criteria shown below. The average of the five evaluations was rounded off to the nearest whole number. Note that when the sample is evaluated as 4 or higher, the sample is determined to be highly accepted by consumers.

[Criteria for Evaluation of Taste and Flavor]
5: Very good
4: Good
3: Slightly good
2: Poor
1: Very poor

[Preparation of Raw Material Fats and Oils: 1]

100 parts by mass of mixed fatty acids (soybean oil fatty acids:rapeseed oil fatty acids=7:3 (mass ratio)) obtained by using undeodorized fats and oils as raw materials and 15 parts by mass of glycerin were mixed, and the mixture was subjected to esterification reaction with an enzyme.

From the resultant esterified product, fatty acids and monoacylglycerols were removed by top-cut distillation, to yield a DAG deacidified oil (containing 86% of diacylglycerols). The oil was found to have a hue of 44 and a glycidol fatty acid ester of 1.8 ppm.

[Adsorbent Contact Treatment]

The DAG deacidified oil was brought into contact with an adsorbent with stirring under reduced pressure and the condition (1) shown in Table 1, and the adsorbent was separated by filtration, to yield fat and oil samples a to f.

[Water Vapor Contact Treatment]

The resultant fat and oil samples a to f were treated with acid (50% aqueous solution of citric acid was added in an amount of 0.5%) at 80° C., washed with distilled water in an amount of 10% relative to the fats and oils three times, and subsequently deodorized by the batchwise method under the condition (2) shown in Table 1. 200 g of the water-washed oil were loaded into a 500-ML glass Claisen's flask, and subsequently brought into contact with water vapor (3%/h-relative to the oil), to yield refined fats and oils (Examples 1 to 15 and Comparative Examples 1 to 5). Table 1 shows the results.

TABLE 1

| | | Example | | | | | | | | | | | | | | | |
|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 |
| Condition (1) | Temperature [° C.] | 105 | 105 | 105 | 105 | 105 | 105 | 105 | 105 | 105 | 105 | 105 | 105 | 105 | 105 | 105 |
| | Contact time [min] | 20 | 20 | 20 | 20 | 20 | 20 | 20 | 20 | 20 | 20 | 20 | 10 | 120 | 20 | 20 |
| | Type of adsorbent | Activated clay | Activated clay | Activated clay | Activated clay | Activated clay | Activated clay | Activated clay | Activated clay | Activated clay | Activated clay | Activated clay | Activated clay | Activated clay | Acid clay | Activated clay |
| | Used amount [%] | 0.25 | 0.5 | 0.5 | 0.5 | 0.5 | 0.5 | 0.5 | 1.0 | 1.0 | 1.0 | 1.0 | 0.5 | 0.5 | 0.5 | 0.5 |
| Analysis value (1) | DAG [%] | 87 | 87 | 87 | 87 | 87 | 87 | 87 | 86 | 86 | 86 | 86 | 87 | 87 | 87 | 87 |
| | Hue 10R + Y | 20 | 18 | 18 | 18 | 18 | 18 | 18 | 15 | 15 | 15 | 15 | 18 | 17 | 26 | 18 |
| | Glycidol fatty acid esters [ppm] | ND | ND | ND | ND | ND | ND | ND | ND | ND | ND | ND | ND | ND | 0.7 | ND |
| Fat and oil sample | | a | b | b | b | b | b | b | c | c | c | c | d | e | f | b |
| Condition (2) | Temperature [° C.] | 200 | 180 | 190 | 200 | 200 | 210 | 210 | 190 | 200 | 200 | 200 | 200 | 200 | 200 | 220 |
| | Pressure [Pa] | 260 | 260 | 260 | 260 | 260 | 260 | 260 | 550 | 550 | 260 | 260 | 260 | 260 | 260 | 260 |
| | Contact time [min] | 34 | 34 | 34 | 34 | 90 | 15 | 34 | 34 | 34 | 34 | 60 | 34 | 34 | 34 | 15 |
| | Amount of water vapor [%] | 1.7 | 1.7 | 1.7 | 1.7 | 4.5 | 0.75 | 1.7 | 1.7 | 1.7 | 1.7 | 3 | 1.7 | 1.7 | 1.7 | 0.75 |
| Analysis value (2) | DAG [%] | 87 | 87 | 87 | 87 | 86 | 86 | 86 | 86 | 86 | 86 | 86 | 88 | 87 | 87 | 86 |
| | Hue 10R + Y | 15 | 17 | 15 | 15 | 14 | 14 | 14 | 13 | 13 | 13 | 13 | 17 | 17 | 19 | 14 |
| | Glycidol fatty acid esters [ppm] | 2.4 | 0.7 | 1.2 | 2.2 | 6.2 | 2.6 | 5.5 | 0.9 | 2.4 | 2.2 | 3.5 | 2.3 | 2.7 | 2.7 | 5.7 |
| Evaluation of taste and flavor | 5 (good) ←→ 1 (poor) | 5 | 4 | 5 | 5 | 5 | 4 | 5 | 5 | 5 | 5 | 5 | 5 | 4 | 5 | 4 |

TABLE 1-continued

|  |  | Comparative Example | | | | |
|---|---|---|---|---|---|---|
|  |  | 1 | 2 | 3 | 4 | 5 |
| Condition (1) | Temperature [° C.] | 105 | 105 | 105 | 105 | 105 |
|  | Contact time [min] | 20 | 20 | 20 | 20 | 20 |
|  | Type of adsorbent | Activated clay | Activated clay | Activated clay | Activated clay | Activated clay |
|  | Used amount [%] | 0.5 | 1.0 | 0.5 | 0.5 | 0.5 |
| Analysis value (1) | DAG [%] | 87 | 86 | 87 | 87 | 87 |
|  | Hue 10R + Y | 18 | 15 | 18 | 18 | 18 |
|  | Glycidol fatty acid esters [ppm] | ND | ND | ND | ND | ND |
| Fat and oil sample |  | b | c | b | b | b |
| Condition (2) | Temperature [° C.] | 170 | 200 | 210 | 220 | 235 |
|  | Pressure [Pa] | 260 | 260 | 260 | 260 | 260 |
|  | Contact time [min] | 34 | 120 | 60 | 34 | 15 |
|  | Amount of water vapor [%] | 1.7 | 6 | 3 | 1.7 | 0.75 |
| Analysis value (2) | DAG [%] | 87 | 86 | 86 | 86 | 86 |
|  | Hue 10R + Y | 17 | 12 | 14 | 14 | 13 |
|  | Glycidol fatty acid esters [ppm] | 0.3 | 8.0 | 10.1 | 14.6 | 18 |
| Evaluation of taste and flavor | 5 (good) ←→ 1 (poor) | 3 | 5 | 5 | 5 | 5 |

Activated clay: GALLEON EARTH V2R (manufactured by MIZUSAWA INDUSTRIAL CHEMICALS, LTD.)
Acid clay: MIZUKA ACE #20 (manufactured by MIZUSAWA INDUSTRIAL CHEMICALS, LTD.)

[Water Vapor Contact Treatment for DAG Water-Washed Oil Obtained by Omitting Adsorbent Contact Treatment]

The DAG deacidified oil was treated with acid (50% aqueous solution of citric acid was added in an amount of 0.5%), washed with water (three times with distilled water), and subsequently deodorized by the batchwise method under the condition shown in Table 2. 200 g of the water-washed oil were loaded into a 500-ML glass Claisen's flask, and subsequently brought into contact with water vapor (3%/h-relative to the oil), to yield deodorized samples (Comparative Examples 6 to 8). Table 2 shows the results.

TABLE 2

|  |  | Comparative Example | | |
|---|---|---|---|---|
|  |  | 6 | 7 | 8 |
| Condition | Temperature [° C.] | 200 | 220 | 245 |
|  | Pressure [Pa] | 260 | 260 | 260 |
|  | Contact time [min] | 34 | 34 | 34 |
|  | Amount of water vapor [%] | 1.7 | 1.7 | 1.7 |
| Analysis value | DAG [%] | 87 | 87 | 88 |
|  | Hue 10R + Y | 25 | 17 | 12 |
|  | Glycidol fatty acid esters [ppm] | 3.3 | 11.4 | 70 |
| Evaluation of taste and flavor | 5 (good) ←→ 1 (poor) | 1 | 3 | 5 |

As clear from Table 1, when the DAG water-washed oil obtained by adding the contact treatment with the adsorbent was brought into contact with water vapor under specific conditions, production of the glycidol fatty acid esters was suppressed and good taste and flavor and good hue were achieved. On the other hand, as shown in Table 2, when the DAG water-washed oil obtained without the contact treatment with the adsorbent was brought into contact with water vapor, the treatment at high temperature resulted that the glycidol fatty acid esters were produced, while the treatment at low temperature resulted that although the glycidol fatty acid ester content was low to some extent, the resultant product had unsatisfactory taste and flavor and poor appearance.

[Preparation of Raw Material Fats and Oils: 2]

97.5 parts by mass of deodorized rapeseed oil and 2.5 parts by mass of glycerin were mixed, and the mixture was dehydrated. Subsequently, sodium methylate was added in an amount of 0.26, and glycerolysis reaction was carried out under the conditions of temperature of 105° C., time of 2 hours, and pressure of 700 Pa. The resultant glycerolysis reaction product was treated with acid (50% aqueous solution of citric acid was added in an amount of 0.8%) at 80° C. and washed with distilled water in an amount of 10% relative to the glycerolysis reaction product three times, to yield a DAG water-washed oil (containing 34% of diacylglycerols). The oil was found to have a hue of 45 and a glycidol fatty acid ester of 108 ppm.

[Adsorbent Contact Treatment]

The DAG water-washed oil was brought into contact with an adsorbent with stirring under reduced pressure and the condition (1) shown in Table 3, and subsequently the adsorbent was separated by filtration, to yield a fat and oil sample g.

[Water Vapor Contact Treatment]

The resultant fat and oil sample g was deodorized by the batchwise method under the condition (2) shown in Table 3. 200 g of the decolored oil were loaded into a 500-ML glass Claisen's flask, and subsequently brought into contact with water vapor (3%/h-relative to the oil), to yield refined fats and oils (Examples 16 and 17). Table 3 shows the results.

TABLE 3

|  |  | Example | |
|---|---|---|---|
|  |  | 16 | 17 |
| Condition (1) | Temperature [° C.] | 105 | 105 |
|  | Contact time [min] | 20 | 20 |
|  | Type of adsorbent | Activated clay | Activated clay |
|  | Used amount [%] | 1.0 | 1.0 |
| Analysis value (1) | DAG [%] | 34 | 34 |
|  | Hue 10R + Y | 18 | 18 |
|  | Glycidol fatty acid esters [ppm] | ND | ND |
|  | Fat and oil sample | g | g |
| Condition (2) | Temperature [° C.] | 200 | 210 |
|  | Pressure [Pa] | 260 | 260 |
|  | Contact time [min] | 34 | 34 |
|  | Amount of water vapor [%] | 1.7 | 1.7 |
| Analysis value (2) | DAG [%] | 34 | 34 |
|  | Hue 10R + Y | 17 | 17 |
|  | Glycidol fatty acid esters [ppm] | ND | 1.3 |
| Evaluation of taste and flavor | 5 (good)↔1 (poor) | 5 | 5 |

Activated clay: GALLEON EARTH V2R (manufactured by MIZUSAWA INDUSTRIAL CHEMICALS, LTD.)

[Water Vapor Contact Treatment for Dag Water-Washed Oil Obtained by Omitting Adsorbent Contact Treatment]

The DAG water-washed oil obtained by the glycerolysis reaction was deodorized by the batchwise method under the condition shown in Table 4. 200 g of the water-washed oil were loaded into a 500-ML glass Claisen's flask, and subsequently brought into contact with water vapor (3%/h-relative to the oil), to yield a deodorized sample (Comparative Example 9). Table 4 shows the results.

TABLE 4

|  |  | Comparative Example 9 |
|---|---|---|
| Condition | Temperature [° C.] | 200 |
|  | Pressure [Pa] | 260 |
|  | Contact time [min] | 34 |
|  | Amount of water vapor [%] | 1.7 |
| Analysis value | DAG [%] | 34 |
|  | Hue 10R + Y | 43 |
|  | Glycidol fatty acid esters [ppm] | 70 |
| Evaluation of taste and flavor | 5 (good)↔1 (bad) | 1 |

As clear from Table 3, when the DAG water-washed oil obtained by adding the contact treatment with the adsorbent was brought into contact with water vapor under specific conditions, refined fats and oils having low content of the glycidol fatty acid esters, good taste and flavor, and good hue were yielded. On the other hand, as shown in Table 4, when the contact treatment with the adsorbent was omitted, the resultant products had high content of the glycidol fatty acid esters, poor taste and flavor, and poor hue.

The invention claimed is:

1. A method for manufacturing refined fats and oils, the method comprising:
    treating fats and oils by bringing the fats and oils into contact with an adsorbent; and
    subsequently treating the fats and oils by bringing the fats and oils into contact with water vapor under at least one of the following conditions:
    condition 1: the time for which the fats and oils are brought into contact with the water vapor in a temperature range of from 175° C. to 205° C. is from 34 to 90 minutes; and
    condition 2: the time for which the fats and oils are brought into contact with the water vapor in a temperature range of from more than 205° C. to 215° C. is from 15 to 34 minutes,
    wherein pressure is from 0.01 to 4.0 kPa,
    wherein the adsorbent comprises at least one member selected from the group consisting of activated carbon, silicon dioxide, and a solid acid, and
    wherein the amount of the adsorbent present is from 0.2 to 1.5 mass % relative to the amount of the fats and oils, and
    wherein the fats and oils comprise 20 mass % or more of a diacylglycerol.

2. The method for manufacturing refined fats and oils according to claim 1, wherein the absorbent is a solid acid which comprises at least one member selected from the group consisting of acid clay, activated clay, activated alumina, silica gel, silica-alumina, and aluminum silicate.

3. The method for manufacturing refined fats and oils according to claim 1, wherein the amount of the adsorbent is from 0.3 to 1.3 mass % relative to the amount of the fats and oils.

4. The method for manufacturing refined fats and oils according to claim 1, wherein the contact temperature between the fats and oils and the adsorbent is from 20 to 150° C.

5. The method for manufacturing refined fats and oils according to claim 1, wherein the amount of the water vapor is from 0.3 to 20 mass % relative to the amount of the fats and oils.

6. The method according to claim 1, wherein the time for which the fats and oils are brought into contact with the water vapor in a temperature range of from 175° C. to 205° C. is from 34 to 60 minutes.

7. The method according to claim 1, wherein the pressure is from 0.06 to 1.0 kPa.

8. The method according to claim 1, wherein the pressure 260 Pa.

* * * * *